Nov. 26, 1968  W. E. GRITT  3,412,623
MULTIPLE SPEED DRIVE
Filed Dec. 19, 1966  2 Sheets-Sheet 1

Inventor:
William E. Gritt
By Walter L. Schleyer, Jr
Russell W. Pyle  Attys.

Nov. 26, 1968

W. E. GRITT 3,412,623

MULTIPLE SPEED DRIVE

Filed Dec. 19, 1966

Inventor:
William E. Gritt
By Walter J. Schlegel, Jr.
Russell W. Pyle
Attys.

United States Patent Office 3,412,623
Patented Nov. 26, 1968

3,412,623
MULTIPLE SPEED DRIVE
William E. Gritt, Indianapolis, Ind., assignor to Amsted Industries Incorporated, Chicago, Ill., a corporation of New Jersey
Filed Dec. 19, 1966, Ser. No. 602,624
7 Claims. (Cl. 74—217)

ABSTRACT OF THE DISCLOSURE

A multiple speed drive includes a sprocket having multiple rows of teeth mounted on a drive shaft, on which is also mounted a clutch engaged sprocket. On a driven shaft is mounted a multiple disk sprocket clutch connected to the sprocket having multiple rows of teeth by a continuous multiple strand chain. The clutches may be alternately engaged to produce a direct drive from the driver shaft and a different speed drive from the driven shaft.

---

This invention relates to multiple speed drives and more particularly to those drives wherein an alternatively engageable multiple disk friction clutch is employed in combination with other clutch means to provide a multiple speed drive.

An object of this invention is to provide a multiple speed drive incorporating alternatively operable clutch means.

Another object of this invention is the provision of an improved multiple disk clutch with high torque capacity that is compact, efficient and inexpensive to produce.

Other objects will appear in the following specification and appended claims and in connection with the accompanying drawings wherein:

Figure 1:
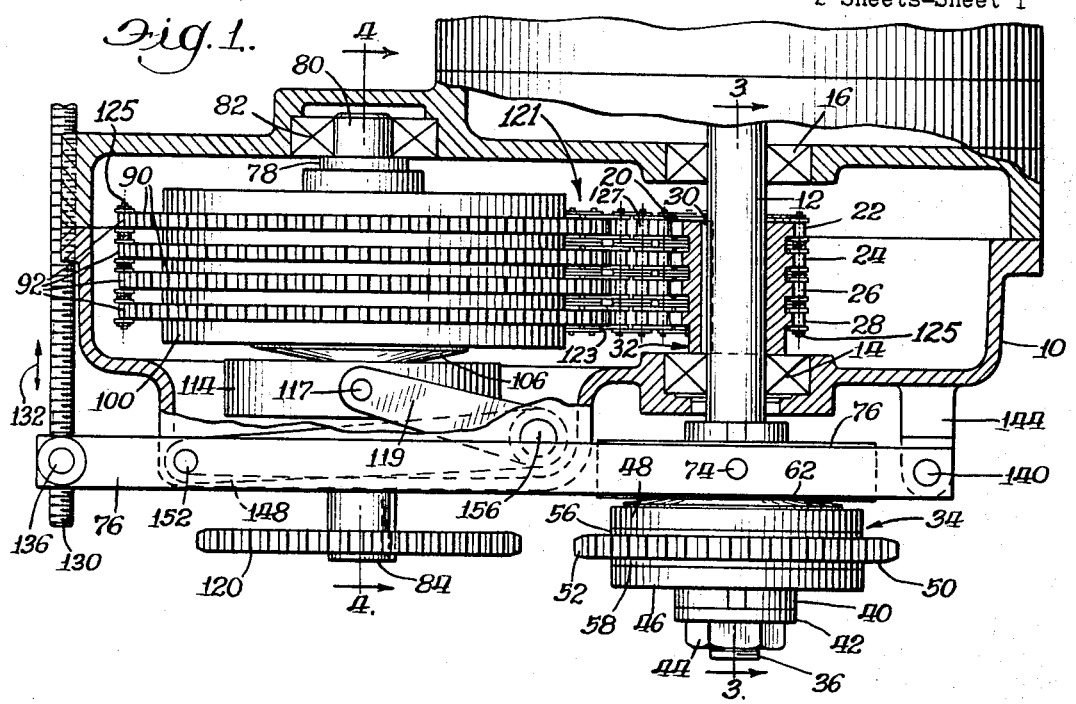
FIGURE 1 is a top view, partly in cross section, of the invention herein described, with certain parts broken away to reveal the inner structure.
Figure 2:
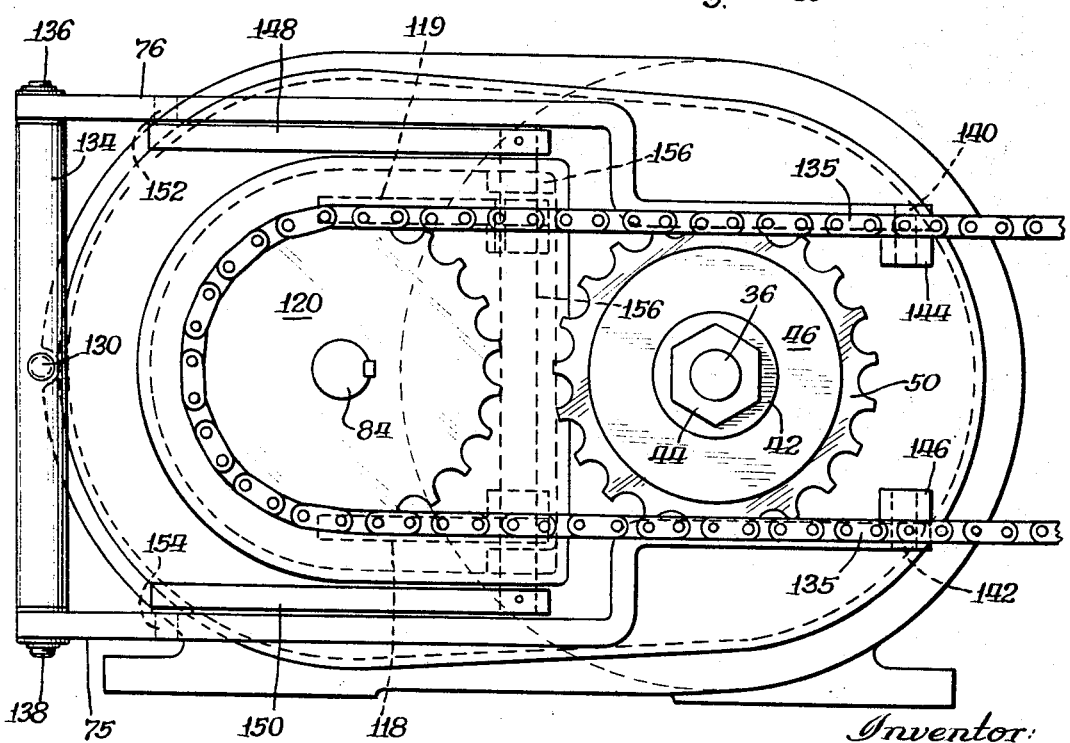
FIGURE 2 is an end elevation view of the invention herein described.

With reference to the drawings, the novel device comprises a multiple speed drive partially enclosed by a housing 10. A drive shaft 12 is rotatably mounted through housing 10 in bearings 14 and 16 secured within opposing walls of said housing such that said shaft extends beyond said housing on either side thereof. Drive shaft 12 is driven proximate its inner end 18 by suitable power means, such as a motor (not shown).

Within housing 10, a driver sprocket element 20, preferably one having a plurality of rows of effective teeth, such as rows 22, 24, 26 and 28, is secured to drive shaft 12 by means of a key 30 in aligned keyways of said shaft and said sprocket element, such that said sprocket element will rotate with said shaft. Driver sprocket element 20 may have an integral hub 32 abutting bearing 14 to prevent outward axial movement of said sprocket element.

Figure 3:
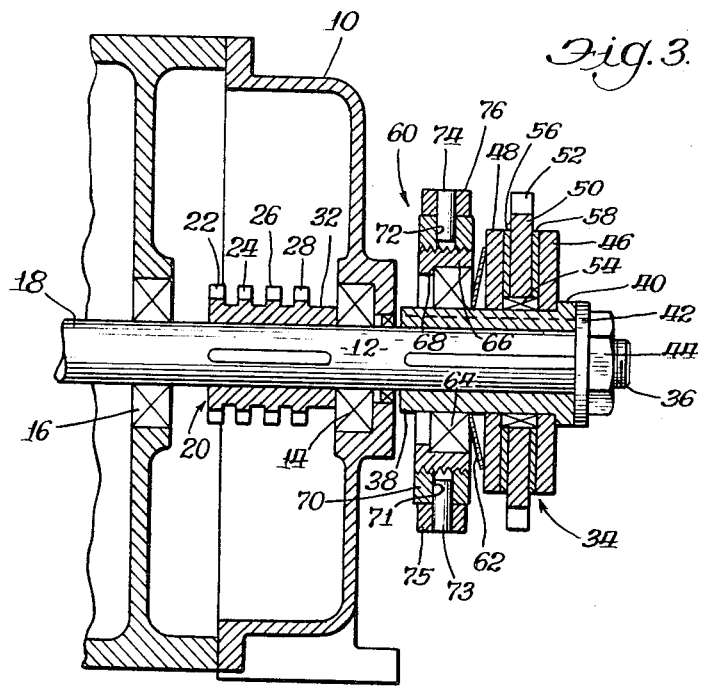
FIGURE 3 is a cross sectional view taken through section line 3—3 of FIGURE 1.

A high speed sprocket clutch means 34, located outside housing 10, is secured proximate the outer end 36 of drive shaft 12. High speed sprocket clutch means 34, as best shown in FIGURES 1 and 3, comprises a hub 38 (FIGURE 3) having an outer flanged end 40 secured against outer axial movement by a washer 42 and a nut 44 in threaded engagement with drive shaft 12 proximate the end thereof 36. A duality of spaced pressure plates 46 and 48 are keyed to hub 38 for rotational movement therewith, the outer pressure plate 46 being restrained against outward axial movement by its abutment with flanged end 40 of hub 38, the inner pressure plate 48 being axially movable with respect to said hub, such that pressure plate 48 may be moved axially toward pressure plate 46. A sprocket element 50 comprising a plurality of teeth 52 is interposed between pressure plates 46 and 48 and is rotatably mounted on hub 38 by means of a bearing 54 journaled on said hub and connected to said sprocket element. Friction disks 56 and 58 are rotatably mounted on bearing 54 on either side of sprocket element 52 and between pressure plates 46 and 48, such that axial movement of pressure plate 48 toward pressure plate 46 will cause said sprocket element to be frictionally engaged and rotate with hub 38 and drive shaft 12.

Means 60 are provided to urge pressure plate 48 axially toward pressure plate 46 which comprises a conical pressure spring 62 surrounding hub 38, the wide end thereof engaging inner pressure plate 48, the narrow end thereof being urged outwardly by a thrust bearing 64 journaled on hub 38. The outer periphery of thrust bearing 64 is connected to and engaged by a cylindrical member 66 having an inner flange 68 engaging said bearing. The outer periphery of cylindrical member 66 is in threaded engagement with a sleeve 70 preferably having two openings 71 and 72 therein for reception of pins 73 and 74 respectively, which also engage actuator arms 75 and 76 respectively. Actuator arms 75 and 76 are operable to urge means 60 against outer pressure plate 48, as will be hereinafter described.

Figure 4:
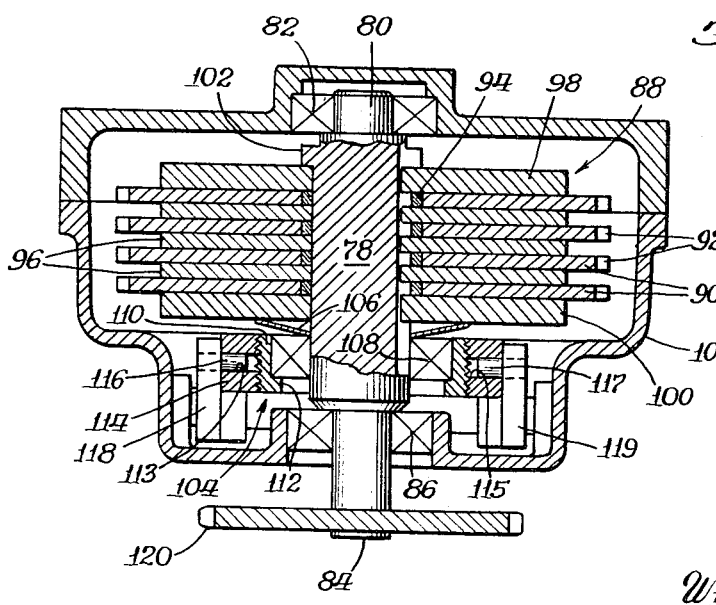
FIGURE 4 is a cross sectional view through section line 4—4 of FIGURE 1.

Spaced from drive shaft 12 and substantially parallel thereto is a driven shaft 78, the inner end thereof 80 journaled in bearing 82 secured within a wall of housing 10, said shaft also being journaled in bearing 86 secured within an opposing wall of said housing proximate the other end 84 of said shaft extending beyond said housing (FIGURES 1 and 4). It may be seen that the portions of shaft 78 journaled in bearings 82 and 86 are of a smaller diameter than the portion of said shaft within housing 10, thereby preventing excessive axial movement of the shaft.

A low speed multiple disk clutch 88 is located on driven shaft 78. Clutch 88 comprises a plurality of plate sprockets 90 each having a plurality of teeth 92, said sprockets being rotatably mounted on driven shaft 78 by means of concentric bearings 94 surrounding said shaft. Sprockets 90 are so designed as to be in alignment with the rows 22, 24, 26 and 28 of driver sprocket element 20. Friction disks 96, are keyed to driven shaft 78 between adjacent plate sprockets 90. Inner and outer pressure plates 98 and 100, respectively, are keyed to driven shaft 78, the inner pressure plate 98 being in abutment with a hub 102 integral with said shaft, the outer pressure plate 100 being axially movable with respect to said shaft. It may be seen that axial movement of outer pressure plate 100 toward inner pressure plate 98 will cause plate sprockets 90 to be frictionally engaged by friction disks 96 and rotate with shaft 78.

Means 104 are provided to urge outer pressure plate 100 toward relatively stationary inner pressure plate 98 which comprises a conical pressure spring 106 surrounding driven shaft 78, the wide end thereof abutting outer pressure plate 100, the narrow end thereof abutting thrust bearing 108 journaled on said shaft. The outer periphery of thrust bearing 108 is connected to and engaged by cylindrical member 110 having a flange 112 engaging said bearing. The outer periphery of cylindrical member 110 is in threaded engagement with a sleeve 114 preferably having two openings 113 and 115 therein for reception of respective pins 116 and 117 which also engage respective shift levers 118 and 119. By means hereinafter described, shift levers 118 and 119 are operable to urge means 104 against outer pressure plate 100. A sprocket element 120 is secured proximate the end 84 of driven shaft 78 extending beyond housing 10 and is preferably in alignment with the sprocket element 50 of high speed clutch means 34.

An endless multiple strand roller chain generally indicated at 121, is of conventional construction and comprises a plurality of interconnected strands of chain including link plates 123 and bushings 127 interconnected by pins 125. The multiple strand roller chain encircles sprocket element 20 of drive shaft 12 and plate sprockets 90 in clutch 88 on driven shaft 78, in a driving relationship. It will be understood by those skilled in the art that the common pins and the coaxial bushings and rollers in the multiple strand chain will serve to align the individual plate sprockets 90 as clutch 88 is engaged. It should be noted in FIGURE 1 that the diameter of plate sprockets 90 is substantially the same for each sprocket, but greater than driver sprocket element 20. The diameter of plate sprockets 90 and sprocket element 20 may be varied relative to one another in order to achieve the desired speed ratio.

Means are provided to alternatively engage one clutch while the other clutch is simultaneously disengaged which may comprise mechanical, electrical or hydraulic means alternatively operable to engage and disengage said clutches. FIGURES 1–4 illustrate a lever system that may be conveniently employed for this purpose. An actuator rod 130 is provided, one end thereof being linearly actuated in the directions of arrow 132 by an electric linear actuator, a gear motor, or other suitable power means (not shown). The other end of actuator rod 130 is in threaded engagement with a cross tie bar 134 which is substantially perpendicular to actuator rod 130. Each end of cross tie bar 134 is pivotally connected by pins 136 and 138 to one end of upper and lower actuator arms 76 and 75, respectively. The other end of actuator arms 76 and 75 are pivotally connected by pins 140 and 142 to spaced brackets 144 and 146, respectively, secured to housing 10, such that said actuator arms are substantially parallel. The parallel movement of actuator arms 75 and 76 directly urge means 60 against or away from inner pressure plate 48 by the pivotal engagement of said arms with pins 73 and 74, intermediate the ends of said arms.

Upper and lower levers 148 and 150 are provided, one end thereof pivotally connected by pins at 152 and 154, respectively, to respective upper and lower actuator arms 76 and 75. The other end of upper and lower levers 148 and 150 are secured to the respective ends of a fulcrum shaft 156 journaled within housing 10. Corresponding ends of spaced shift levers 118 and 119, hereinbefore mentioned, are keyed to fulcrum shaft 156 proximate the ends thereof within housing 10. The parallel movement of shift levers 118 and 119 urge means 104 against outer pressure plate 100 of multiple disk clutch 88 by the pivotal connection of the other end of said levers to respective pins 117 and 116 and thus to sleeve 114.

It may now be seen that the movement of actuator rod 130 in one direction will cause engagement of high speed sprocket clutch means 34 while the low speed multiple disk clutch 88 is disengaged. Similarly, the movement of rod 130 in the opposite direction will simultaneously cause clutch means 34 to disengage and clutch 88 to engage. Thus, sprocket elements 120 and 52 may be alternatively engaged to produce a two speed drive. A continuous chain 135 may be placed in engagement with sprocket elements 120 and 52, which chain, in turn, may operate a series of sprockets (not shown) in a rack and pinion type drive. It should be noted that during which time such chain is driven by one sprocket element 52 or 120, the other sprocket element may freely rotate.

Having thus described the invention, what is claimed is:

1. A two speed drive comprising a rotatable drive shaft, means driving said drive shaft, a sprocket element rotatably mounted on said drive shaft, clutch means secured to said drive shaft for frictionally engaging said sprocket, a second rotatable shaft, a plurality of sprocket elements rotatably mounted on said second shaft, second clutch means secured to said second shaft for frictionally engaging said sprocket elements on said second shaft, means between said shafts for driving said plurality of sprocket elements, and means for alternatively engaging one clutch means while disengaging the other clutch means.

2. The invention according to claim 1 wherein said second clutch means comprises first and second pressure plates connected to said second shaft for rotation therewith, at least one of said pressure plates being axially movable, a plurality of sprocket elements rotatably mounted on said second shaft between said pressure plates, a friction disk secured to said second shaft between adjacent sprocket elements, and means to urge said pressure plates axially relative to one another.

3. The invention according to claim 1 wherein the means between said shafts for driving said plurality of sprocket elements comprises a multiple sprocket element secured to said shaft substantially aligned with said plurality of sprocket elements, and endless multiple strand chain engaging said multiple sprocket element and said plurality of sprocket elements.

4. A two speed drive comprising a support, a rotatable drive shaft carried by said support, driving means at one end of said drive shaft, a multiple sprocket element secured to said drive shaft and rotatable therewith; a first clutch means comprising a duality of pressure plates secured to said drive shaft proximate the end thereof remote from said driving means, the innermost pressure plate of said pressure plates being axially movable with respect to said drive shaft, first and second friction disks rotatably mounted on said drive shaft between said pressure plates, a second sprocket element rotatably mounted on said drive shaft between said friction disks; a second rotatable shaft carried by said support, second clutch means comprising first and second pressure plates secured to said second shaft for rotation therewith, said first pressure plate axially movable with respect to said shaft, a plurality of sprocket elements rotatably mounted on said second shaft between said first and second pressure plates in substantial alignment with said multiple sprocket element on said first shaft, said plurality of sprocket elements being of a larger diameter than said multiple sprocket element, friction means on said second shaft between adjacent sprocket elements of said plurality of sprocket elements, a third sprocket element secured to said second shaft, an endless multiple strand chain engaging said plurality of sprocket elements and said multiple sprocket element in driving relationship, means comprising a second chain engaging said second and third sprocket elements, said second chain being operable to engage other sprocket elements in a driving relationship, and means for moving said innermost pressure plate toward said outermost pressure plate while moving said first pressure plate toward said second pressure plate and for moving said innermost pressure plate away from said outermost pressure plate while moving said first pressure plate away from said second pressure plate.

5. The invention according to claim 4 wherein said last mentioned means comprises at least one actuator arm pivotally connected at one end thereof to said support, said arm pivotally connected intermediate its end to said innermost pressure plate, at least one lever secured at one end to a shaft journaled in said support, the other end of said lever being pivotally connected to said actuator arm intermediate the end thereof, at least one shift lever secured to said shaft and pivotally connected to said first pressure plate, and means for moving the other end of said actuator arm.

6. A drive mechanism comprising a drive shaft, a driver sprocket keyed thereto and comprising axially spaced annular rows of sprocket teeth, a driven shaft, a plurality of sprocket elements rotatably mounted on the driven shaft and axially movably thereon, a spacer means keyed to and axially movable on said driven shaft for spacing said sprocket elements, a friction plate keyed on said driven shaft, a multiple strand roller chain engaging said rows of teeth and engaging said sprocket elements, and clutch means for urging said sprocket elements and spacer means axially of the driven shaft into a pile against the friction plate to drive said driven shaft.

7. A drive mechanism according to claim 6, wherein each of said sprocket elements has the same number of teeth as every other sprocket element and each row of teeth has the same number of teeth as every other row of teeth and wherein the first-mentioned number is unequal to the second-mentioned number, and wherein a second sprocket is rotatably mounted on the drive shaft and wherein a third sprocket is keyed on the driven shaft, and wherein a second clutch means is provided for engaging the second sprocket with the drive shaft for rotation therewith and wherein means are provided for actuating one clutch means while releasing the other, and wherein a chain is meshed with both the second and third sprockets for driving an associated mechanism.

References Cited
UNITED STATES PATENTS

| | | | |
|---|---|---|---|
| 545,165 | 8/1895 | Fountain | 74—217 |
| 1,988,748 | 1/1935 | Pearmain | 192—69 |
| 2,814,372 | 11/1957 | Hussa | 192—48 |
| 2,976,007 | 3/1961 | Sheetz. | |

FRED C. MATTERN, JR., *Primary Examiner.*

JAMES A. WONG, *Assistant Examiner.*